Aug. 4, 1964 M. J. CARSEN ETAL 3,143,348
CARD GAME FOR AMUSEMENT AND EDUCATIONAL PURPOSES
Filed Feb. 24, 1961 3 Sheets-Sheet 3
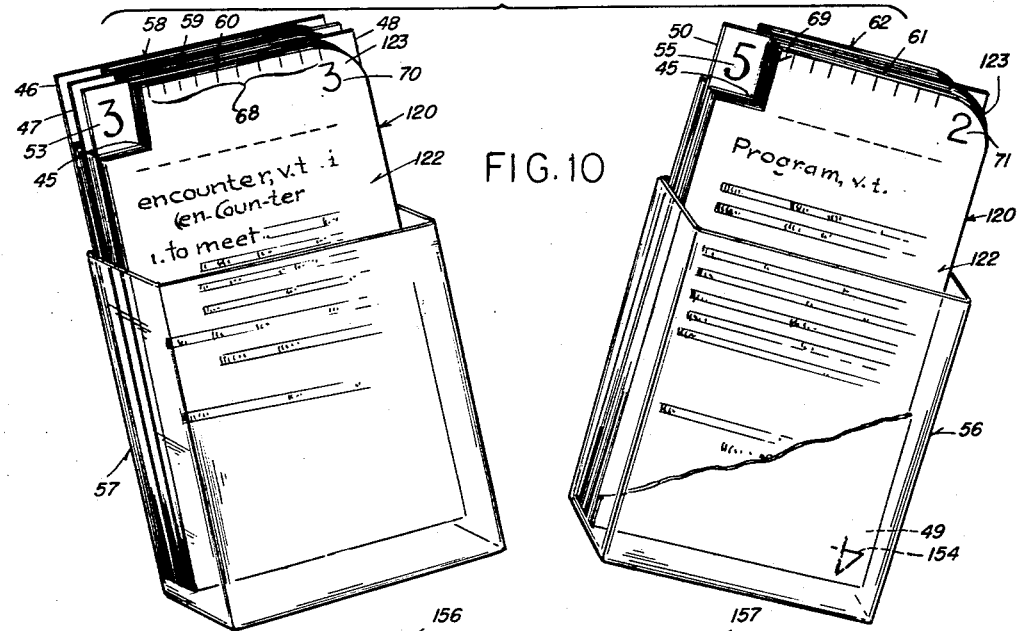
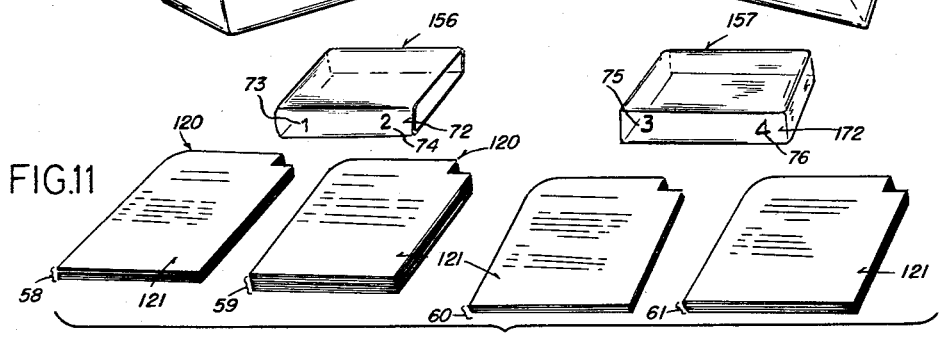
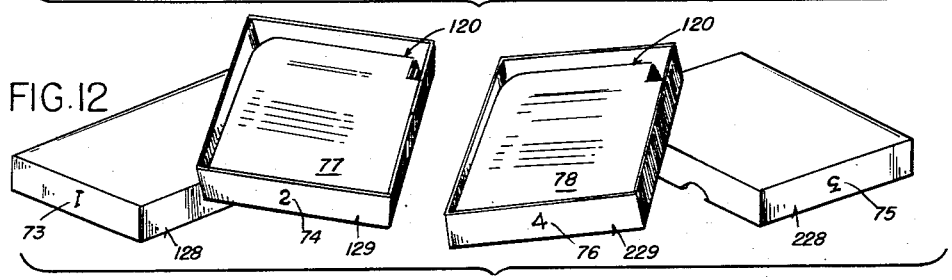
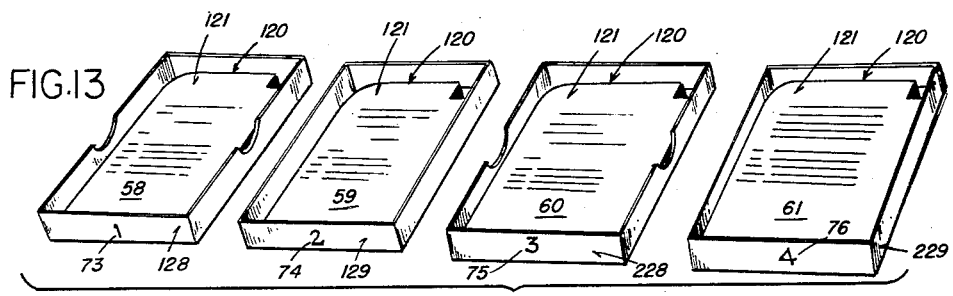

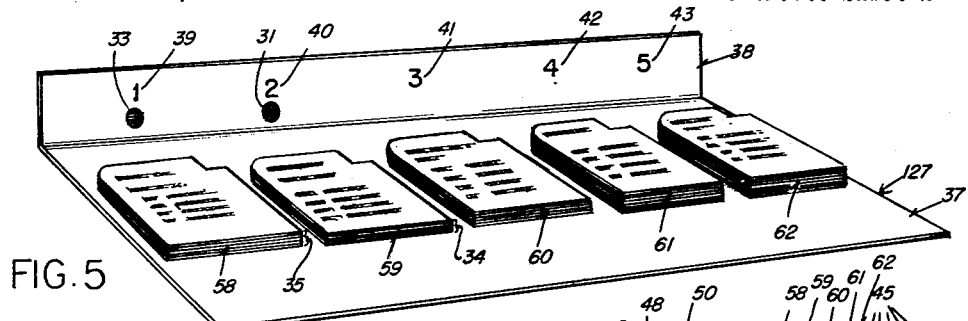
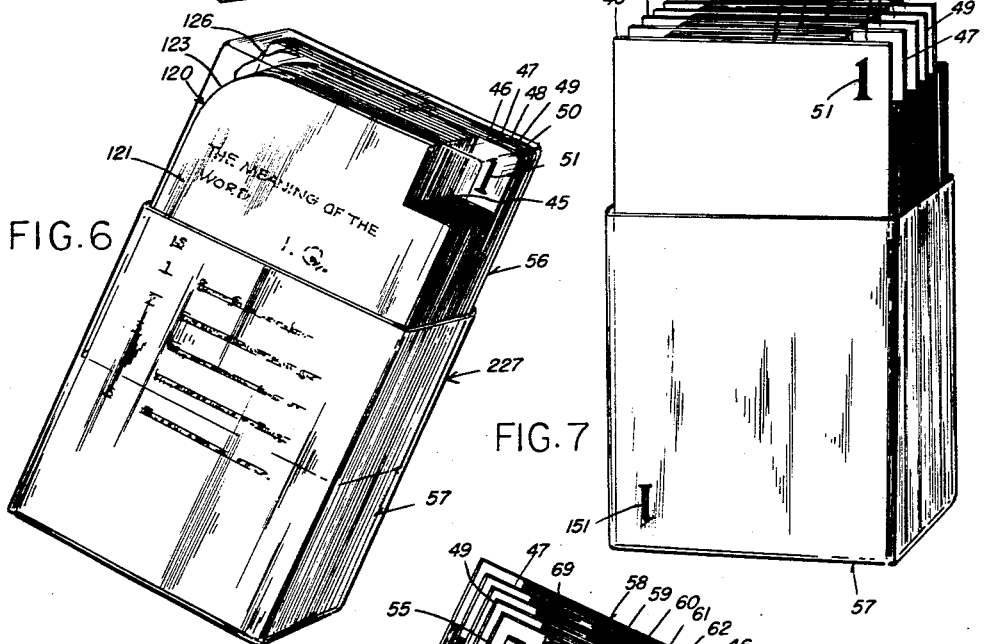

United States Patent Office 3,143,348
Patented Aug. 4, 1964

3,143,348
CARD GAME FOR AMUSEMENT AND
EDUCATIONAL PURPOSES
Marx J. Carsen and Roy A. Carsen, Whitestone, N.Y.,
assignors to Carsen & Son, Ltd., Long Island City,
N.Y., a corporation of New York
Filed Feb. 24, 1961, Ser. No. 91,480
12 Claims. (Cl. 273—152.1)

The present invention relates to a card game and has for a general object the provision of a deck of special game cards each bearing information on both sides, in association with classifying means for directing the filing or selective placement thereof in accordance with the conclusions of a player, the classifying means also being designed to indicate the correctness of the conclusions for scoring purposes.

Another object of the invention is to provide such a deck of cards and classifying means which are keyed together by corresponding identifying indicia to inform a manipulator whether he has drawn a correct conclusion as to a put or implied question on the face side of each game card which guides his placement of the latter relative to the classifying means.

An additional object of the invention is to provide such decks of game cards and associated classifying means in forms which a manipulator may use with ease for his own amusement or which may be employed by a group of competitive players for comparative scoring as a form of amusement.

A further object of the invention is the provision of forms of such decks of game cards and associated classifying means which may be employed as efficient computing devices accurately to measure mental work done or knowledge acquired regarding certain subjects to which the decks are related.

A still further object of the invention is to provide structural embodiments of the invention which are readily and economically constructed or produced and which permit efficient use and operation thereof with extreme ease and simplicity of manipulation.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 5 is a perspective view of another form of classifying means of the present invention which may be employed with different embodiments of decks of the game cards;

FIG. 6 is a perspective view of a further embodiment of an encased deck of game cards of the present invention;

FIG. 7 is a perspective view of a part of the case illustrated in FIG. 6 and showing arrangements of the game cards in segregated groups or divided sections as dictated by the classifying means of this embodiment;

FIG. 8 is a perspective view of the upper right hand corner of a classified deck of cards similar to that shown in FIG. 7, illustrating a modified form of certain section dividing cards thereof which may facilitate the classification and the classifying indicia thereon;

FIG. 9 is a perspective view of the structure illustrated in FIG. 7, as viewed from the opposite side thereof;

FIG. 10 is a perspective view of all of the parts of the embodiment illustrated in FIG. 6 with parts broken away, showing a possible use thereof in checking the correctness of the classification practiced in attaining the arrangement and structure of FIG. 9;

FIG. 11 is a perspective view illustrating another type of classification which may be performed with the casing parts and deck of game cards illustrated in FIG. 6 when the parts of the case are provided with certain classifying indicia;

FIG. 12 is a perspective view of another embodiment of the invention which may employ the deck of game cards of the FIG. 6 embodiment with the use of different forms of encasing means to serve as the classifying means; and FIG. 13 is a perspective view of the structure shown in FIG. 12, illustrating the manipulative use of the parts thereof in the classification of the game cards.

Figure 1:
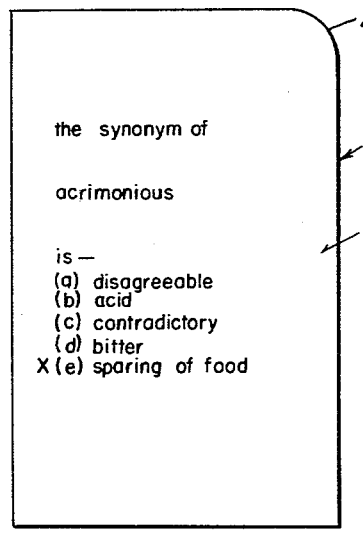
FIG. 1 is a plan view of an "entry word" or question and answer face side of a game card which may be stacked with others of similar structure to provide an embodiment of a deck of the present invention.

Referring to the drawings, like numerals identify similar parts throughout. In all of the embodiments illustrated in the drawings, the invention consists of a card game comprising a deck of cards each having a face side bearing at least one answer to a put or implied question for exposure to view upon being uncovered by removal of all of the other cards which may cover this face, and also a hidden back side bearing one of a plurality of distinctly different identifying indicia. In these embodiments, each card has means to facilitate uniform stacking of the cards in the deck with their question sides or alternatively their answer sides all facing in the same direction. In all of these embodiments classifying means are provided which have a plurality of different delineated group locations for selectively receiving the cards in different groups at the different locations and with each group location being identified by certain indicium differing distinctly from all of the identifying indicia associated with all of the remaining group locations of the classifying means, each group location identifying indicium being apparently associated with and corresponding to only one of the distinct identifying indicium carried by the back sides of the cards, i.e., having a predetermined matching relation to this particular distinct card-carried identifying indicium. Such predetermined matching correspondence may be substantial shape duplication on the card back of the particular indicium associated with a particular group location of the classifying means, or color matching thereof; or the same or similar letters, figures, symbols, or words recognized as conveying similar meaning.

Figure 2:
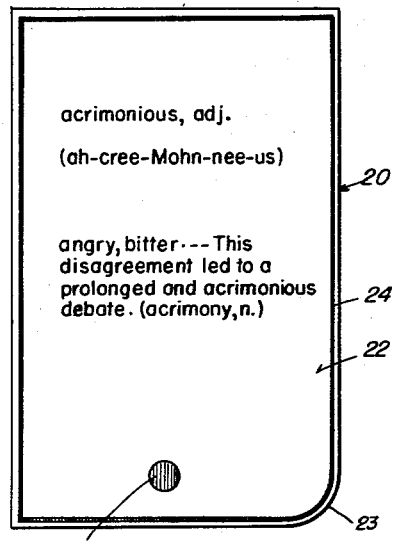
FIG. 2 is a plan view of the information back side of the game card illustrated in FIG. 1.

In the embodiment illustrated in FIGS. 1 to 4 incl., each game card 20 has a question and answer face side 21 and an information back side 22, as are respectively illustrated in FIGS. 1 and 2, with each card bearing means to facilitate uniform stacking of the cards in a deck with their question and answer sides all facing in the same direction, which may be in the form of a particular shaping of some one portion of each card. For example, the card 20, illustrated in FIGS. 1 and 2, is generally rectangular in plan view, but the upper right hand corner 23 thereof as the card is viewed from its question and answer face side 21 is rounded off, so that this corner differs in shape from the shapes of the remaining three corners. The rounded or curved corners 23 of the cards 20 provide simple means for readily assuring the manipulater that he has all of the cards in a deck thereof arranged in uniform manner, i.e., with the question and answer face sides 21 of all of the cards facing in the same direction and with printed matter thereon oriented for ready reading. This feature is useful to a manipulator, particularly when he wishes to shuffle the cards in a deck for indiscriminate location therein to avoid any tendency of memorizing correct classifying disposition of any one card due to a particular location in the deck.

Let it be assumed that a deck of cards, in which the game cards 20 are each of the type illustrated in FIGS. 1 and 2, is to be employed for asking questions relative to the synonyms of different entry words imprinted upon the respective question and answer face sides 21 of the cards. One such card 20, for example, that illustrated in FIGS. 1 and 2, may bear a portion of a question in the form of "the synonym of acrimonious is." Below the entry word "acrimonious" may be listed a plurality of proposed answers "(a)," "(b)," "(c)," "(d)," and "(e)." It may be desired to put the question to the manipulator by marking one of these listed answers, such as by identifying it with indicium, e.g., an "X," directing placement of this card in a certain one of a group of locations in accordance with the manipulator's decision as to the correctness thereof. The game to be played with such a deck of cards may involve so designating or identifying a wrong or incorrect answer with the intent of misleading the manipulator if he is not certain of the correct meaning of the word "acrimonious." As is illustrated in FIG. 1, such a misleading marking has been accomplished by applying the indicium "X" opposite the answer listing "(e) sparing of food." If in the subsequent manipulation of the card 20 of FIGS. 1 and 2 the manipulator was misled wrongly to classify it his error in classification would be made apparent by a discrepancy between informative identifying indicium on the hidden back side 22 of the card 20 and the classifying indicia identifying a certain group location of the classifying means to which the manipulator was misled to select for classification placement of the card. Also, this may become apparent to the manipulator in checking the correctness and incorrectness of his classifying of the game cards by the reading of the information on the back side 22 of the card. For example, as is illustrated in FIG. 2, the back side 22 of the card 20 bears a definition of "acrimonious," which indicates that the synonym thereof must be the listed "(d) bitter" answer. The manipulator then, if he recognized the entry word "acrimonious" and knew its meaning, should have placed the game card 20 of FIGS. 1 and 2 in a classifying group location of the classifying means which would indicate that the answer marked with "X" was incorrect or wrong.

The informative indicium on the hidden back side 22 of the card 20 would be in a form which indicated that the wrong answer was deliberately marked on the answer face 21 of the card, and, for this purpose, the information back side 22 might be provided with a particularly designed or colored border 24, which may be in the color red to indicate that the answer was wrong and that the card should have been placed in a wrong answer group location of the classifying means. Such informative indicium on the information side 22 of the card 20 may, of course, be in the form of a colored area, such as the red spot 25, and other equivalent means will readily occur to one practicing the invention, such as the simple use of either of the words "wrong" or "incorrect."

Figure 3:
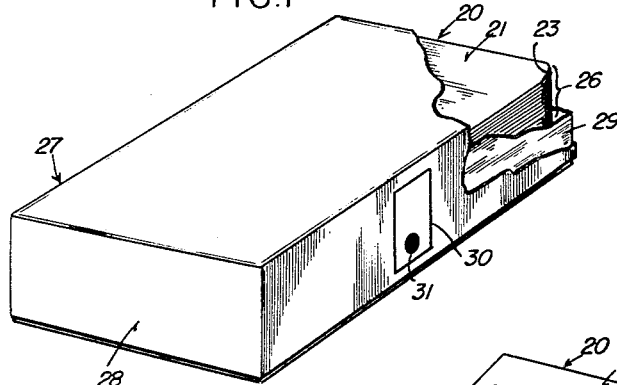
FIG. 3 is a perspective view, with parts broken away, of a deck of the game cards of the embodiment illustrated in FIGS. 1 and 2, showing the deck suitably housed in a plural-section case, the parts of the latter being designed to serve as classifying means.

In the embodiment of FIG. 3, consisting of an encased stack or deck 26 of the game cards 20, the case comprises a rectangular slip top box 27 which houses the deck of game cards. The slip top box or case 27 comprises telescoped top and bottom sections 28 and 29 which, when separated, provide the card receptive trays 28 and 29 illustrated in FIG. 4. The card-receptive trays 28 and 29 provide a pair of delineated group locations into which the manipulator is to classify the game cards of the deck 26. It will be noted from FIGS. 3 and 4 that the slip top tray 28 may carry a bordered area defined by a border 30 of the same color as the colored border 24 on the hidden information back side 22 of game card 20, as is illustrated in FIG. 2, as well as a colored spot 31 corresponding to the colored spot 25 on the card back side. The receptive tray 29 provided by the bottom of the slip top case 27 also carries classifying indicia corresponding to the informative indicia on the back side 22 of the card 20, such as an area defined by a border 32 in a different color such as blue, which may be supplemented with or for which may be substituted a colored spot 33 in blue. This would indicate that any card bearing a correct indication on its face side of a certain correct answer should be placed in the tray 29 identified by the blue classifying indicia in the form of the blue markings, and any such card which had correctly indicated on its question and answer face side the proper answer to the question would bear on its hidden back face a corresponding informative indicia, such as a blue border instead of the red border 24 and/or a blue spot instead of the red spot 25.

Let it be assumed that the embodiment of the invention illustrated in FIGS. 1 to 4 incl. is to be employed for the purpose of amusing the manipulator. He may select any desired scoring which appeals to him, such as a grant of 100% correctness for all correct answers in the manipulation of a deck 26 of such game cards, from which he would subtract a certain amount of percentage points for each incorrect placement or classification, such as 2%. The manipulator will lift off the slip top tray 28 and invert it to a card-receptive position, as is illustrated in the left side of FIG. 4, and remove the deck 26 of upwardly facing game cards 20 from the bottom tray 29. The manipulator then holds the deck 26 in one hand while he successively inspects the answers on the question and answer face sides 21 of the game cards 20 and then, in accordance with his conclusions as to whether the marked answers are correct or incorrect, classifies the cards in or distributes them to the incorrect answer tray 28 and the correct answer tray 29. Let it be assumed that in this manner he has classified a group 34 of the game cards in the group location delineated by the wrong answer tray 28 and another group 35 of the game cards in the correct answer group location delineated by the tray 29, in the manner illustrated in FIG. 4.

The manipulator may then check the correctness of his classification of the two groups 34 and 35 of game cards 20 at the respective group locations delineated by the wrong answer tray 28 and the right answer tray 29. For example, he may tilt forward the top game card in the stack 34 in the wrong answer tray 28 and place it upon the flat surface supporting this tray at the position 200 before the classifying indicia 30 or 31 carried by this tray, to face upwardly the information side 22 of this card. He will immediately note, by comparing the informative indicium, such as the blue colored spot 36 with the color of the classifying indicium, either the red border 30 or the red spot 31 on the face side of the wrong answer tray 28, that he has incorrectly classified this card. He should have placed the latter card in the right answer tray 29. He thus scores an error against himself, and if he wishes to learn something more about the correct definition of the entry word on the facing down question and answer face side 21 of this card he may read the text on the upwardly facing information side 22, in an effort to avoid repeating the error in the future.

In checking the correctnesses of his classifying placement of the cards in the stack 35 within the group location delineating tray 29 he may perform a similar action with the top card of this stack, placing it in the right hand position at 2000 before the classifying indicia 32 or 33 on the front side of this tray. The manipulator may then again note that he has committed an error in the classifying placement, since the informative indicia 25 on the information side 22 of this card is red and does not correspond to the blue color of the classifying indicium 32 or 33. He again scores an error against himself, and then may attempt to increase his knowledge or avoid committing such an error in the future by reading the text on the upwardly facing information side of the game card 2000.

The card game device of FIG. 3 may be employed for purposes of amusement in a competitive manner with an opponent. For example, one manipulator may take a turn of the type described with the device and score himself by subtracting the accumulated error percentage from 100%. The opponent may then use the same device in a similar manner to calculate his score, and the opponent having the greatest accumulated score, of course, wins the game. In such an amusement game, each of the opponents may be provided with one of the devices illustrated in FIG. 3 and play simultaneously, it being advisable of course that they use duplicate decks for a true reflection of an exact comparison of accumulated scores.

However, the use of the embodiment of the invention illustrated in FIGS. 1 to 4 incl. is not limited to amusement. It may be used advantageously as a mental work or accomplishment computor. For example, let it be assumed that the manipulator is a student in a certain grade in school and it is desired to compute or check at home the mental work or accomplishment he has performed or attained in a certain subject. Such a deck 26 of cards 20 may have ben programmed for such subject by an instructor skilled therein and familiar with the scope of the ground covered by such a course. The manipulator may thus check his accomplishment daily with such a device. Or a controller, such as a tutor or parent may do so, by checking with the manipulator the correctness of his classifying placement of the game cards 20 in the deck 26 and helping him to score the results, then perhaps persuading the student manipulator to do some studying as to the textual matter on the information sides 22 of the cards with which he committed the errors. By making a game of this checking procedure it is a much easier matter for a parent to persuade a faulting student to do some additional studying with the use of these game cards which may have more appeal for many students than do text books.

Figure 4:
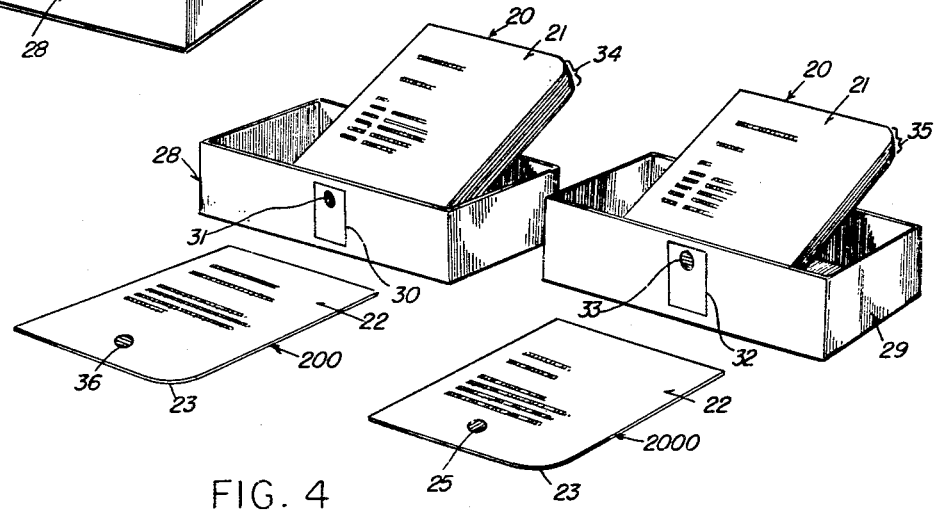
FIG. 4 is a perspective view of the game cards and parts of the case of FIG. 3 when arranged for manipulation, showing placement of groups of the game cards in separate parts of the classifying means and illustrating a step in checking the proper filing of these game cards in the respective classifying means parts.

FIG. 5 illustrates that the classifying means of an embodiment of the present invention may take a form appreciably different from that illustrated in FIGS. 3 and 4. For example, let it be assumed that the classifying means is in the form of a rack 127 having a horizontal plane surface section 37 on which at least two of the groups of game cards may be placed, such as the stacks 35 and 34, accumulated in successive distribution of the cards in the manner of the placements thereof in their receptive trays 29 and 28 of FIG. 4. The rack 127 may also have an upstanding back wall 38 connected to the flat section 37 along its rear edge, with this back wall carrying suitable classifying indicia delineating group locations in front thereof on the flat section. For example, the far left portion of the top surface of flat section 37 may be delineated as a right or correct classified group location by a blue colored spot 33 as the classifying indicium, and the portion of the top surface of this flat section next adjacent and to the right thereof may be delineated by a red colored spot 31 as a group location for the wrong or incorrect classified group location, both of these classifying indicia being carried by the upright back wall section 38, as shown. In accumulating the two classified groups 35 and 34 upon the rack flat section 37, the successive game cards of the deck are placed by the manipulator in either one or the other of these two group locations in accordance with his conclusions or decisions as to the correctness or incorrectness of the marked answers on the answer face sides of these cards, each being placed one above the other with its question and answer face side uppermost in either one or the other of these two groups or stacks as he proceeds in progressive inspection through the deck. The manipulator or a controller then checks the results, and may score the latter, in a manner similar to those proposed above in connection with FIG. 4.

The classifying means embodiment illustrated in FIG. 5 may also be employed in connection with another embodiment of the deck of the present invention. For example, the rack 127 may be wide enough to receive, side-by-side, upon its horizontal or flat section 37 a plurality of groups or stacks greater than two, e.g., five, for a purpose clarified later in connection with the following descriptions of further embodiments of the deck of game cards. For this purpose, five group locations may be delineated on the horizontal or flat section 37 by different classifying indicia, such as the numerals "1" at 39, "2" at 40, "3" at 41, "4" at 42, and "5" at 43, on the upright wall 38 therebehind. Each of these numerals constitutes a classifying indicium delineating the card-receptive group location immediately there in front of the top surface of the rack flat section 37.

In FIGS. 6, 7, 9 and 10 are further illustrated an additional embodiment of the card game of the present invention comprising different forms of both the deck of cards and the classifying means. The deck of game cards 126 comprises a stack of cards 120 each of generally rectangular shape and of like outline in plan. As will be seen from FIG. 6, each game card 120 has a question and answer or choice face side 121 and an information reverse or back side 122 illustrated in FIGS. 9 and 10. Let it be assumed that the cards in the deck 126 are to be concerned with the correct meaning of a series of words or expressions. For example, the topmost card 120 in the deck 126 may inquire on its answer choice face 121 of the meaning of the expression "I.Q.," the latter constituting the expression or word entry, under which may be listed a plurality of proposed or multi-choice answers, such as five, each identified by a different numeral. Answer "1" may propose as the answer "intelligence," answer "2" may propose the answer "intelligence quota," answer "3" may propose the answer "intelligence quotience," answer "4" may propose the answer "intelligence quotient," and answer "5" may propose the answer "social intelligence." The information back side 122, illustrated in FIG. 9 and the right side portion of FIG. 10, of this same card 120 will then indicate that the expression "I.Q." is the abbreviation for "Intelligence Quotient" and, if desirable, additional supplementary information, such as how this quotient is determined. Thus, the correct proposed answer on the question and answer face side 121 of this card 120 is item "4," which the manipulator should have selected or chosen in directing its placement or filing it in a selected one of a plurality of delineated group locations. The numbers which identify the five different proposed answers constitute different indicia, each directing different filing or placement of the card in such group locations. Since the correct answer is that identified by indicium "4" the information back side 122 of the card will bear a corresponding informative indicium, which may be the numeral "4," as is indicated at 44 in FIG. 9. Should it be desired to employ the classifying means 127 of FIG. 5 with such a deck of game cards 126, the numerals 39 to 43 incl. on the upstanding back wall section 38 will constitute the classifying indicia thereof, and the manipulator will place each card with the answer choice face 121 uppermost in the one delineated group location before these classifying indicia as he may think is correct, to provide, for example, five different groups or stacks on the horizontal or flat classifying rack section 37, as is depicted in FIG. 5. It is to be understood that the number of delineated group locations provided on or in the classifying means must be at least equal to the greatest number of the proposed answers or choices borne by any one game card in the deck 126, such as the five shown at 58 to 62 incl. in FIG. 5.

One corner of each of the game cards 120 in the deck 126 bears means to facilitate uniform stacking of the cards in the deck with their answer choice face sides 121 all facing in the same direction. For this purpose, the upper left hand corner 123 of each game card 120, when viewed from the answer choice face side 121 thereof may be arcuately shaped, such as by curved trimming, to distinguish it from the other corners of each of the cards. As in the deck 26 of cards of the embodiment of FIGS. 1 to 4 incl. this feature readily permits uniform arrangement of the cards in the deck.

Each of the game cards 120 is provided in a certain location with a removed section to permit viewing at that location of certain classifying indicium beyond a stack of the cards when these are arranged with all of their question and answer face sides 121 uniformly oriented and facing in the same direction. Preferably, the removed section of each of the game cards 120 is in the form of a relatively large notch at one of its corners, such as the upper right hand corner when the answer face side 121 is facing toward the viewer, as is illustrated by the notches at 45. There is associated with the stack 126 of game cards a plurality of generally rectangular section dividing cards each bearing a different classifying indicium in the location of the removed section of each game card or its notch 45. Thus, for a deck 126 of game cards in which the card 120 having the greatest number of proposed answers bears five thereof upon its answer face side 121, there will be associated therewith five of these sections dividing cards 46, 47, 48, 49 and 50. Each of the section dividing cards 46 to 50 inclusive bears on its upper right hand corner its own distinct classifying indicium, such as "1" for the first section dividing card 46, as will be seen in FIGS. 6 and 7. The second section dividing card 47 bears in the same position the classifying indicium "2," the third bears in the same location the classifying indicium "3," the fourth bearing the classifying indicium "4," and the fifth carries at the like position the classifying indicium "5." These same exposed corners of the section dividing cards 46 to 50 carry at the same locations on the opposite faces like classifying indicia, e.g., "3" at 53 on division card 48, as seen in the left side of FIG. 10, and "5" at 55 on division card 50 as seen in FIG. 9 and the right side of FIG. 10. This latter feature permits the classifying indicia of any particular section dividing card to be viewed either from the front or the back of the deck through the notches 45 of the game cards 120 stacked thereover or arranged thereagainst.

While the rounded corners 123 of the game cards 120 may serve to apprise a manipulator of uniform arrangement thereof in a group or deck, such as 126, it is to be understood that the notches 45 may serve this purpose. However, the cutting back of both top corners of each game card 120, at 123 and 45, facilitates ready location of the section dividing cards 46 to 50 inclusive, particularly when the game cards are distributed in groups intermediate thereof as is apparent from FIGS. 7, 9 and 10.

While the provision of classifying indicia on opposite faces of one corner of each of the section dividing cards 46 to 50 inclusive will serve the intended purpose, it may be desirable to provide diagonally opposite corners thereof with the same classifying indicia, in inverted positions, such as is illustrated at 151 in FIG. 7 and 154 in FIG. 10, or all four corners of each of the faces of each of these divider cards may be so provided with its proper classifying indicium. In this manner either end of each of the rectangular section dividing cards 46 to 50 inclusive may serve as the top thereof with its particular classifying indicia exposed to view in the notches 45 of the game cards 120, either from the front or back. The section dividing cards 46 to 50 inclusive serve as elements of the classifying means, as will be made apparent hereinafter.

The embodiment of the card game illustrated in FIGS. 6, 7, 9 and 10 also includes, as a part of the classifying means, a case 227 having a pair of cooperating sections 56 and 57, one of which is movable or removed to open the case, leaving the deck of cards in the other section with portions of the cards in the latter being manually accessible for withdrawal and replacement in classified groups. The card-housing case 227 preferably has its sections 56 and 57 in the form of open mouth pockets telescoped together with at least one, and preferably both, being of less depth than the length of the game cards 120. These open mouth pockets 56 and 57 are preferably rectangular in shape so that when they are telescoped together to form the case 227 it is in the form of a hollow, right angle parallelepiped, and when only one thereof is of less depth than the lengths of the game cards it serves with the section dividing cards 46 to 50 inclusive, as the classifying means. But when both of the pockets 56 and 57 are of such lesser depth either may cooperate with the section dividing cards 46 to 50 inclusive to constitute the classifying means. Preferably, the open mouth pockets or case sections 56 and 57 are formed of transparent material so as to permit ready view of the deck 126 therethrough. As will be understood from FIG. 6, both the open mouth pockets 56 and 57 are in rectangular transverse section larger than a transverse cross-section of the stack of game and section dividing cards 126 and 46 to 50 inclusive housed therein, but of course one of these pockets must be of a rectangular transverse section smaller than that of the other to permit the telescopic interengagement illustrated in FIG. 6.

Let it be assumed that the embodiment of FIG. 6 is to be employed either as a game of amusement or as an educational game, with the case 227 housing a deck 126 of the game cards 120 of the type illustrated and described above, along with the section dividing cards 46 to 50 incl., the cards being preferably arranged in the manner indicated in FIG. 6. The manipulator may use such embodiment without the requirement of a horizontal or flat supporting surface. For example, he may withdraw the pocket section 56 from the pocket section 57, store the former in a convenient place, such as one of his garment pockets, and begin successively to classify the deck 126 of game cards. Let it be assumed that the front game car 120, bearing on its question and answer face or choice side 121 the expression entry "I.Q.," is deduced by the manipulator to belong in the classification group delineated by the numeral "5" on the section dividing card 50, because he believes that the answer choice marked "5" is the correct one. The manipulator will then withdraw this game card from the deck 126 and the pocket 57 and replace it or file it behind the section dividing card bearing the classifying indicium "5." He then successively repeats this filing of choice procedure with respect to all of the remaining game cards 120 in the deck 126, distributing them in accordance with his conclusions behind the several section dividing cards 46 to 50 incl., so as to produce the classified rearrangement of FIGS. 7 and 9, in which five separate groups 58, 59, 60, 61 and 62 are developed respectively behind the section dividing cards, i.e., he files them in these separate section groups respectively intervening section dividing cards 46 and 47, 47 and 48, 48 and 49, 49 and 50, and behind the section dividing card 50. The resulting classified rearrangement may appear from the front as is illustrated in FIG. 7 and from the rear as is illustrated in FIG. 9.

In order to facilitate identification of the various section dividing cards in the middle of the group thereof before they become appreciably spaced by intervening filed game cards it may be desired to supplement the numeral classifying indicia thereon by additional classifying indicia more apparent from their edges, or to substitute such for the printed classifying indicia. For example, as is illustrated in FIG. 8, the upper right hand corners of the section dividing cards 46 to 50 incl. in the area of the game card notches 45 may be provided with a number of small notches, which may be equal in number to the numerals borne thereby if the latter are also used. Thus, the side edge of section dividing card 46 may have a small notch 63 therein, the side edge of section dividing card 47 may have two small notches 64 provided therein, the side edge of section dividing card 48 may have a series of three small notches 65 formed therein, the side edge of section dividing card 49 may have four small notches 66 therein, and the side edge of section dividing card 50 may have a series of five small notches 67 provided therein. These distinguishing notches in the side edges of the section dividing cards 46 to 50 incl. will guide the filing or placement of the game cards relative thereto, into the separate groups 58 to 62 incl., particularly when it is difficult to observe one or more of the classifying indicia on the upper right hand corners of the section dividing cards in the intermediate positions. Further, these side notches 63 to 67 incl. may serve as the classifying indicia on the section dividing cards 46 to 50 incl. alone, and the order may be reversed with dependence upon the intelligence of the manipulator to acquire the proper mental association between indicia.

After the classification or filing of the game cards 120 has been accomplished in this manner to produce the classified or filed arrangement illustrated in FIG. 7, the manipulator may turn the unit depicted in the latter figure around to the position illustrated in FIG. 9 for determining the correctness of his classifying or filing of his choices. For example, it will immediately be seen from FIG. 9 that he made an error in placing the first "I.Q." game card in the group 62 associated with the classifying indicium "5" borne by the section dividing card 50. The informative indicia "4," indicated at 44 on the information back side 122 of this card does not correspond with this group classifying numeral "5." In scoring the classification he must thus count this misplacement or choice filing as an error, or the controller working with him may do so, and the rules under which he is operating may charge against him for this error minus 4%.

It will be noted from FIG. 9 that the information back side 122 of each game card 120 may bear along one or more edges thereof a series or row of small delineated check areas, which may be provided by a series of closely spaced marks depicted at 68. The manipulator, or his controller, may desire to keep a score of the number of times the manipulator makes an error with respect to any particular game card, and this is accomplished by making a check mark, such as that shown at 69 in FIG. 9, in one of the check areas. This will aid a manipulator to concentrate on the questions which he most frequently misses. After the manipulator has gone through and rearranged the game cards of the deck an appreciable number of times extending perhaps over a period of days, the cards which bear no such check marks may be withdrawn from the deck and the manipulator can concentrate on those bearing a plurality of the check marks, supplementing his efforts of proper classification with study of the information back sides thereof.

In checking the results of the manipulator's classification of the game cards 120 to produce the arrangement of FIG. 9, he or his controller will withdraw the game cards 120 successively from the group 62 to inspect those underneath, finally withdrawing the section dividing card 50 for access to the next successive group 61 behind the section dividing card 49. In this fashion he works back through the groups classified by the manipulator, and in doing so will arrive at an arrangement of the cards as illustrated in the left hand side of FIG. 10. It will there be noted that the manipulator was correct in placing the game card bearing the word entry "encounter" in the classified group 60, since the informative indicium "3" at 70 on the information back side 122 of this game card corresponds to the classifying indicium "3" at 53 on the section dividing card 48. Having been correct with respect to this game card, the manipulator or his controller does not apply a check mark in the series of check areas 68, and if the manipulator has gone through the deck a number of times, this card might be removed from the deck and set aside because of the certainty of his understanding and recognition of the meaning of the word "encounter."

In so checking back through the classified game cards one may maintain an orderly arrangement thereof in the fashion illustrated in the right side of FIG. 10. He may employ for this purpose the remaining pocket section 56 of the case 227, placing therein successively each game card as he checks the correctness of his classification and removing it from the pocket section 57. Thus, as he has checked through a portion of the classified stack of game cards 120 and section dividing cards 46 to 50 incl. to the point illustrated in the left portion of FIG. 10, he will have developed the arrangement illustrated in the right side of FIG. 10. From the latter, it will be noted that the manipulator made a mistake in his classification of the game card 120 which bore the word entry "program," since the informative indicium "2" on the information back side 122 thereof does not correspond with the classifying indicium "4," indicated at 154 on the portion of the section dividing card 49 which is associated with the classified group 61 of game cards. This mistake was scored as an error by the application of the check mark at 69. After all of the classified cards have been checked with their successive removal from the pocket section 57 with progressive placement thereof in the other pocket section 56 there will be an accurate record in the latter of the classified grouping which he had attained in arranging the FIG. 7 classification, and this will permit the results to be checked at a later time if desired. Ultimately, the game cards 120 and the section dividing cards 46 to 50 incl. will be removed from the classifying pocket section 56 for a rearrangement in the manner indicated in FIG. 6 to permit a repeat of the classification.

The telescoping case pockets 56 and 57 of the case 227, depicted in FIGS. 6, 7, 9 and 10, may be provided with additional means so that they may serve as a different form of classifying means of the present invention. As is illustrated in FIG. 11, one of the pockets 156 may bear on an edge side 72 thereof suitable classifying indicia, such as the numerals "1," at 73, and "2," at 74. An edge side 172 of the other case pocket 157 may bear in similar manner, as classifying indicia, the numerals "3," at 75, and "4," at 76. When these case pockets 156 and 157 have their face sides rested upon a flat surface, such as a desk top, these classifying indicia "1," "2," "3," and "4," delineate group locations in the form of areas of the desk top surface they are in front of, upon which game cards 120 may be stacked in the four groups 58, 59, 60 and 61, with their question and answer sides 121 uppermost. Of course, after the classification or distribution of the game cards 120 into the four different groups 58 to 61 incl., the correctness of the placement thereof will be checked in a manner similar to that previously described, i.e., by successively picking up each card and turning it over to check by the information on the information back side of each and the informative indicium carried by each the correctness of the classifying placement which apprises the manipulator of the correctness or incorrectness of his conclusions.

In FIGS. 12 and 13 is illustrated a further embodiment of the invention in which the classifying means is in the form of a plurality, such as a pair, of slip top cases with one comprising telescoped top and bottom sections 128 and 129 and the other comprising telescoped top and bottom sections 228 and 229. The deck of game cards 120 is divided into two groups, such as 77 and 78, as is illustrated in FIG. 12. The sections of the pair of slip top cases are respectively provided with suitable classifying indicia. For example, the slip top section 128 may be provided with an inverted classifying indicium, such as numeral "1," on one side edge thereof, e.g., at 73, and the bottom section of this case 129 is provided with its classifying indicium in the form of upright numeral "2" at 74. The other slip top case has its top and bottom sections 228 and 229 provided with their classifying indicia in the form of inverted numeral "3," at 75, and upright numeral "4" at 76.

In employment of the embodiment illustrated in FIG. 12 let it be assumed that the manipulator slips off the top sections 128 and 228 of the two cases and withdraws from the bottom sections 129 and 229 thereof the two stacks or groups 77 and 78 of the game cards 120. Placing the two groups 77 and 78 game cards together he may shuffle as he desires to provide the deck, and then place the case sections 128, 129, 228 and 229 upon a flat surface as card-receptive classifying trays. With all of the question and answer face sides 121 of the game cards 120 uppermost in the deck the manipulator then proceeds successively down therethrough, in a manner similar to that described above, studying the question and answer face side of each card to conclude into which of the four trays he should place each card for proper classification. As a result of such manipulation the manipulator will produce the four groups 58, 59, 60 and 61 nested in the four classifying trays 128, 129, 228 and 229, as is illustrated in FIG. 13. The manipulator will then check the correctness of his classifying as previously indicated, by inspecting the information back sides of the game cards to determine if the informative indicia thereon correspond to or match the classifying indicia on the trays at 73, 74, 75 and 76, scoring against himself his errors. Of course, this checking may be done by a controller, such as a tutor or parent when the manipulator is a student. As previously indicated, such embodiment of the device may be employed for amusement or may be used by opponents engaging in a contest of amusement.

It will thus be seen that embodiments of the present invention may employ as the game cards those which may bear questions of the true or false type or questions of the multi-choice type. The questions may relate to a wide variety of subjects, such as word meanings, grammar, mathematics, science, history, geography, etc. The term "corresponding" as used herein in matching answer indicia with informative indicia borne by the game cards, and with classifying indicia borne by the classifying means, is used in a sense broader than like indicia. Although the simplest way of providing such correspondence of indicia is to make them like, they may differ so long as they provide for instantaneous recognition of matching association. The term "game" as used herein is employed in a broad sense. "Game" includes within its meaning the definitions "an amusement or diversion"; or a contest, which may be mental, conducted according to set rules, and undertaken for amusement or recreation; and also "a scheme or art employed in the pursuit of an object or purpose; method of procedure; projected line of operations; plan; project; course," such as that which may be practiced for the purpose of measuring mental work done or knowledge acquired. While it may be preferred to have the cards in such a deck programmed by experts before distribution, it is to be understood that the classifying means or the portable portions thereof may be distributed with game cards in blank form to be programmed by the user, if desired.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A card game comprising a deck of cards of like physical construction each having a face side bearing at least one answer to a put or implied question for exposure to view upon being uncovered by removal of all of the other cards which may cover this face and a hidden back side bearing one of a plurality of distinctly different identifying indicia, each card bearing means to facilitate uniform stacking of the cards in the deck with their answer face sides all facing in the same direction, and classifying means of a physical structure differing distinctively from that of all of said cards having a plurality of different delineated group locations for selectively receiving said cards in different groups at the different locations, each such face-borne answer card having a recognizable association to only one of the plurality of group locations which directs transfer by a manipulator of the deck to such group location of this card as a result of the manipulator's exercise of judgment of the truth or falsity of the answer, each group location being identified by certain indicium differing distinctly from all of the identifying indicia associated with all of the remaining group locations of said classifying means with each group location identifying indicium being in a predetermined matching relation apparently associated with and corresponding to only one of the distinct identifying indicia carried by the back sides of said cards and with that of each card hidden from the view of the manipulator as the face side of this card is observed by him for selective classification in said group locations, the attainment by the manipulator in his judging the truth or falsity of a particular answer indicated on the exposed face side of any particular card of such matching relation between the hidden indicium on the back side of this card and the indicium identifying a particular classifying group location to which he transfers this card in the exercise of such judgment being informative of the correctness of the manipulator's classifying action, and vice versa.

2. A card game comprising a deck of cards of like physical construction each having a face side bearing at least one answer to a put or implied question and a back side bearing information indicating the correctness of the answer, each card bearing means to facilitate uniform stacking of the cards in the deck with their answer sides all facing in the same direction, and classifying means of a physical structure differing distinctively from that of all of said cards having a plurality of different delineated group locations for selectively receiving said cards in different groups at the different locations, each such face-borne answer card having a recognizable association to only one of the plurality of group locations which directs transfer by a manipulator of the deck to such group location of this card as a result of the manipulator's exercise of judgment of the truth or falsity of the answer, each group location being identified by certain classifying indicium differing distinctly from all of the identity classifying indicia associated with all of the remaining group locations of said classifying means, each of said cards carrying on its back side an informative indicium corresponding to and associating it in a predetermined matching relation with only one of the group location classifying indicia, so that when the classifying manipulator of the deck in his judging the truth or falsity of a particular answer indicated on the exposed face side of any particular card attains such matching relation between the hidden indicium on the back side of this card and the indicium identifying a particular classifying group location to which he transfers this card in the exercise of such judgment the attainment will be informative of the correctness of the manipulator's classifying action, and vice versa, so as to inform a person upon inspection of the back sides of a plurality of the cards after selective classification thereof into the groups by the manipulator of the correctness of his action in the selective classification of the cards while observing the face sides thereof with their back sides hidden, for the purpose of scoring.

3. The card game as defined in claim 2 characterized by each card bearing on its answer face side a plurality of different proposed answers one of which is to be selected by the manipulator to direct placement of this card in a selected one of the groups, at least one of said answers being identified by indicium directing placement of said card in a certain one of said group locations in accordance with the manipulator's decision as to the correctness thereof.

4. The card game as defined in claim 3 characterized by said answer identifying indicium being in a form indicating this as the correct answer and directing placement of this card in a group location of said classifying means selected for the correct answer group upon the conclusion of the manipulator that this answer is correct, another group location of said classifying means being selected for the incorrect answer group with its classifying indicium so identifying it for placement there of the card upon the conclusion of the manipulator that the answer identifying indicium was misleadingly associated with an incorrect answer.

5. The card game as defined in claim 4 characterized by said classifying means being in the form of a slip top case housing said deck and comprising telescoped top and bottom sections providing when separated card-receptive trays as a pair of the delineated group locations, one of said trays carrying the correct answer classifying indicium corresponding to the correct answer informative indicium on the back sides of some of the cards with the other tray carrying the incorrect answer classifying indicium corresponding to the incorrect answer informative indicium on the back sides of some other of the cards.

6. The card game as defined in claim 2 characterized by each game card bearing on its answer face side a plurality of different proposed answers one of which is to be selected by the manipulator to direct placement of this card in a selected one of the groups with the proposed answers identified by different indicia each directing different placement of said card in certain ones of said group locations, the different classifying indicia identifying the different group locations of said classifying means respectively corresponding to the different answer identifying indicia with the number of the identified group locations being at least as great as the greatest number of different proposed answers borne on the answer face side of any one card in the deck, the information back side of each card bearing an informative indicium corresponding to the placement directing indicium identifying the one of the proposed answers on the answer face side thereof which is correct and corresponding to the classifying indicium identifying one of the group locations of said classifying means.

7. The card game as defined in claim 6 characterized by said classifying means being in the form of a plurality of slip top cases with each comprising telescoped top and bottom sections providing when separated a plurality of separate card-receptive trays at least equal to the required number of the delineated group locations with this number of trays bearing the different classifying indicia, said cases housing different groups of the cards which together form the deck thereof.

8. The card game as defined in claim 6 characterized by said deck of game cards being housed in a case having a pair of cooperating sections, one of which is movable to open said case leaving the deck in the other section with portions of the game cards in the latter being manually accessible for withdrawal and replacement in classified groups, and a plurality of additional section dividing cards also housed in said case to form therewith said classifying means and with each of said section dividing cards having an observable exposed portion extending beyond margins of said game cards and bearing on its exposed portion one of the different classifying indicia.

9. The card game as defined in claim 8 characterized by said case having its sections in the form of transparent open mouth pockets telescoped together with at least one being of less depth than the lengths of said game cards to serve with said section dividing cards as said classifying means and to provide the manually accessible portions of said answer cards projecting from the open mouth of said pocket.

10. A card game comprising a deck of generally rectangular game cards each having a face side bearing a plurality of multi-choice questions with each of the latter identified by a different indicia directing placement of the card in a certain one of a plurality of group locations, each card having a back side bearing correct information regarding the questions on the face side from which one can deduce which thereof is correct, each card having a section thereof in a certain location removed to permit viewing at that location of certain classifying indicium beyond a stack of the cards when arranged with all of their answer face sides uniformly arranged and facing in the same direction, a plurality of generally rectangular section dividing cards each bearing a different classifying indicium in the location of the removed section of each game card, and a rectangular case housing the deck of game cards and section dividing cards with the latter located together behind all of said game cards, said case comprising a pair of open mouth pockets of rectangular transverse section with the latter of one pocket being larger than a transverse cross section of the stack of said game and section dividing cards but smaller than that of the other pocket for telescope of the mouth of this other pocket over the mouth of the former pocket, at least one of said pockets being of a relatively shallow depth which is appreciably less than the lengths of said cards to provide projecting portions of the latter for manual engagement allowing withdrawal of each and selective replacement relative to a certain one of said section dividing cards, the back information side of each game card bearing an informative indicium corresponding to the indicium identifying the proposed answer on the face side of this card which is correct and also corresponding to the classifying indicium on one of said section dividing cards, said relatively shallow pocket and said section dividing cards constituting together game card classifying means.

11. The card game as defined in claim 10 characterized by each of said game cards having its removed section in the form of a relatively large notch at one of its top corners with the same corners of all of said game cards provided with such notches when stacked with their question faces facing in the same directions and through which the classifying indicium on any one of said section dividing cards may be observed when a group of said game cards is stacked in front of the latter.

12. The card game as defined in claim 11 characterized by both of said case pockets being formed of transparent material with both sides of each of said section dividing cards having corners thereof provided with the same classifying indicia observable through notches of said game cards when groups of the latter are stacked to both sides of said section dividing card.

References Cited in the file of this patent

UNITED STATES PATENTS

| | | |
|---|---|---|
| 2,008,829 | Israel | July 23, 1935 |
| 2,652,635 | Conger | Sept. 22, 1953 |
| 2,731,270 | Schulz | Jan. 17, 1956 |
| 2,776,498 | MacDonald et al. | Jan. 8, 1957 |